United States Patent [19]

Sato et al.

[11] Patent Number: 5,754,680
[45] Date of Patent: May 19, 1998

[54] OBJECT SHAPE EXPRESSION APPARATUS

[75] Inventors: Junichi Sato, Kadoma; Masamichi Nakagawa, Hirakata, both of Japan

[73] Assignee: Matsushita Electric Industrial Co., Ltd., Osaka-fu, Japan

[21] Appl. No.: 299,801

[22] Filed: Sep. 1, 1994

Related U.S. Application Data

[63] Continuation of Ser. No. 34,569, Mar. 19, 1993, abandoned.

[30] Foreign Application Priority Data

Mar. 19, 1992 [JP] Japan ................... 4-062997

[51] Int. Cl.$^6$ ................... G06T 17/20
[52] U.S. Cl. ................... 382/154; 345/423; 356/376
[58] Field of Search ................... 356/376; 364/560, 364/564, 468.04; 395/119, 120; 382/203, 173, 154; 345/423, 429, 419, 420

[56] References Cited

U.S. PATENT DOCUMENTS

| | | | |
|---|---|---|---|
| 4,385,361 | 5/1983 | Moates | 382/113 |
| 4,674,869 | 6/1987 | Pryor et al. | 356/376 |
| 4,791,482 | 12/1988 | Barry et al. | 382/203 |
| 4,802,759 | 2/1989 | Matsumoto et al. | 356/376 |
| 4,819,195 | 4/1989 | Bell et al. | 364/560 |
| 4,961,154 | 10/1990 | Pomerantz et al. | 345/419 |
| 4,982,438 | 1/1991 | Usami et al. | 382/154 |
| 4,997,369 | 3/1991 | Shafir | 364/560 |
| 5,003,498 | 3/1991 | Ota et al. | 345/420 |
| 5,027,281 | 6/1991 | Rekow et al. | 356/376 |
| 5,102,224 | 4/1992 | Uesugi et al. | 356/376 |
| 5,170,352 | 12/1992 | McTamaney et al. | 364/424.031 |
| 5,189,626 | 2/1993 | Colburn | 395/120 |
| 5,280,542 | 1/1994 | Ozeki et al. | 382/154 |
| 5,280,569 | 1/1994 | Tsujido | 395/119 |
| 5,369,734 | 11/1994 | Suzuki et al. | 395/119 |
| 5,465,323 | 11/1995 | Mallet | 395/120 |

FOREIGN PATENT DOCUMENTS 1-269177  10/1989  Japan.

OTHER PUBLICATIONS

Schmitt et al., "Fast Segmentation of Range Images into Planar Regions," Proceedings 1991 IEEE Computer Society Conference on Computer Vision and Pattern Recognition, pp. 710–711, Jun. 1991.

Yang, et al. "An Overview of Geometric Modeling Using Active Sensing" IEEE Control Systems Mag. vol. 8, Iss:3, Jun. 1988, pp. 5–13.

Y. Chen et al., "Object Modeling by Registration of Multiple Range Images", Proceedings IEEE International Conference on Robotics and Automation, pp. 2724–2729 (Apr. 1991).

G.A. Bastov, et al., "Program Complex for Synthesizing Digital Models of the Surfaces of Complex Objects from Plane Images", Measurement Techniques, vol. 35, No. 3, pp. 293–297 (Mar. 1992).

EPO Search Report (93104419.2) dated Feb. 10, 1995.

K. Sato & S. Inokuchi, "Range–Imaging System Utilizing Nematic Liquid Crystal Mask", IEEE, at 657–661 (1987).

Primary Examiner—Yon Couso
Assistant Examiner—Jon Chang
Attorney, Agent, or Firm—Ratner & Prestia

[57] ABSTRACT

The object shape expression apparatus includes a surface data producing unit which produces three dimensional coordinate data of the object surface by impinging a slit light on the object. A surface orientation calculation means calculates tilted angle of normal lines extended from said object surface defined by said three dimensional coordinate data. An area dividing unit divides the three dimensional data into a plurality of sets such that the surface orientation included in each sets are within a predetermined range. Each of thus obtained sets of three dimensional coordinate data represents a single unit of areas conforming the object surface. A plane patch generator generates flat or curved plane patches for each of area to form a three dimensional model data representing the object. Since the object surface is divided into areas based on the surface orientation thereof, the portion changing its configuration greater is expressed by more areas.

27 Claims, 6 Drawing Sheets

5,754,680

OBJECT SHAPE EXPRESSION APPARATUS

This application is a continuation of application Ser. No. 08/034,569 filed Mar. 19, 1993, now abandoned.

BACKGROUND OF THE INVENTION

1. Field of the Invention

The present invention relates to an object shape expression apparatus for expressing the shape of the object and, more particularly, to an object shape expression apparatus used to express solid shapes during compilation of an object shape database for computer graphics or robotics by measurement of three dimensional objects.

2. Description of the Prior Art

An object shape expression apparatus that measures the outside shape of an object to express the three dimensional shape thereof using a surface model is well known in the art. In FIG. 7, one example of such an object shape expressing apparatus, disclosed in the Japanese Laid-open Patent Publication No. H1-269177 is shown. This object shape expressing apparatus generates the solid model based on the contour line data.

The object 201 is rotated with respect to a rotation axis thereof and slit light 303 is projected from the slit light generator 302 to the object 201 with certain declination angle θ. This generates a slit light projection area (contour line data at declination angle θ of the cylindrical coordinate system (r, θ, z)) on the object 201 from which the slit light 303 reflects and enters in the television camera 305. The television camera 305 produces video signals based on such slit lights 303 reflected from the object 201. Thus produced video signal is written to the image memory (not shown) by the digital image processing unit 401 and converted to a pixel sequence.

The coordinates of the pixels in the image memory are converted on the slit light plane by the three dimensional coordinate conversion unit 402. The linear approximater 403 approximates the pixel sequence converted to the slit light plane with a linear sequence. The rotating coordinate converter 404 converts the end points of the linear sequence obtained by the linear approximation processor 403 to the three dimensional coordinates at the initial state before rotating the object 201, and defines the coordinates after conversion as the nodal points.

The nodal point connector 405 connects the nodal point sequence of the same declination angle θ with the nodal point sequence of the adjacent declination angle θ. Triangular patches are generated by performing this connection. By performing this process for all declination angles θ, the nodal point connector 405 generates triangular patches for the entire circumference of the object, and expresses the overall shape of the object using a surface model of triangular patch sets.

When an object shape is expressed by means of a surface model of triangular patches or other flat patches, object shapes can be expressed with little error if sets of patches of a constant small size are used, but this requires a massive data quantity because, for example, even flat surfaces are expressed with many small patches. It is therefore necessary to efficiently and with a small data quantity and little error express object shapes based on the shape of the surface.

For example, with the above conventional technology, the three dimensional shape of a surface is not sufficiently reflected and the data quantity grows because sets of three dimensional coordinates of the object surface are divided two dimensionally on the contour lines by generating the nodal points of the triangular patches on the contour lines. In addition, the precision of the object surface expressed by triangular patches is related to the overall shape of the object because the nodal points of the triangular patches are extracted at a constant pitch of declination angle θ from the center of the rotating axis of the object 201. In other words, the problem exists that the greater the distance any surface of the object is from the rotating axis, the larger the triangular patches used and the rougher the approximation of the expression regardless of the surface shape.

SUMMARY OF THE INVENTION

The object of the present invention is therefore to provide an imaging device which solves these problems.

The present invention has been developed with a view to substantially solving the above described disadvantages and has for its essential object to provide an improved object shape expressing apparatus.

In order to achieve the aforementioned objective, an shape expression apparatus for expressing an object object's shape comprises surface data generating means for generating a surface data of said object, surface data dividing means for dividing said surface data into a plurality of sections, each section containing a plurality of surface data, and normal lines extended from a surface defined by said surface data in one section being within a predetermined tilted angle from each other, and surface data replacing means for replacing said surface data in one section with a plurality of substitute surface data which define a plane surface on said one section.

BRIEF DESCRIPTION OF THE DRAWINGS

These and other objects and features of the present invention will become clear from the following description taken in conjunction with the preferred embodiment thereof with reference to the accompanying drawings throughout which like parts are designated by like reference numerals, and in which.

DETAILED DESCRIPTION OF THE PREFERRED EMBODIMENT

Figure 1:
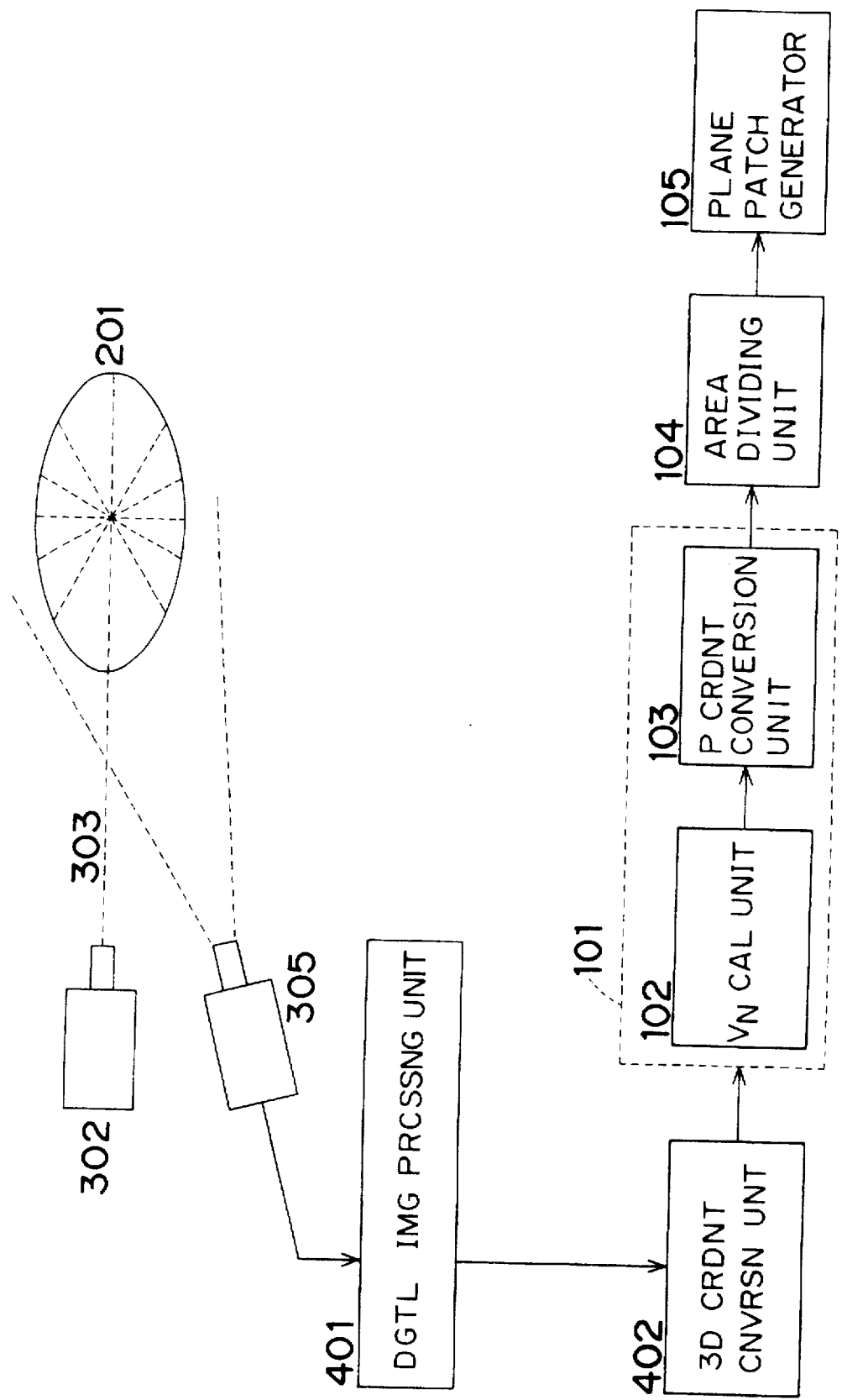
FIG. 1 is a block diagram showing an object shape expressing apparatus according to the present invention.
Figure 6:
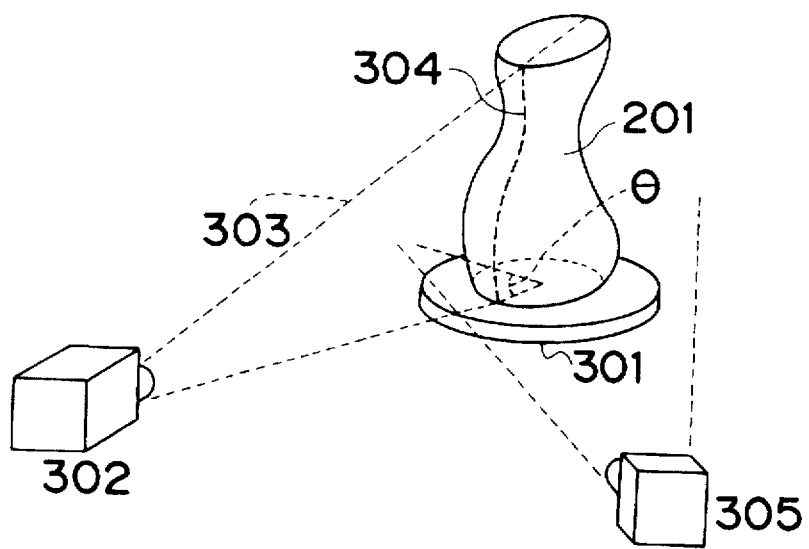
FIG. 6 is an illustration of assistance in explaining the method to measure the contour line data in the direction of declination angle θ of the object using a light-section method.

Referring to FIG. 1, an object shape expression apparatus according to the present invention is shown. The object shape expression apparatus includes a slit light generator 302 for projecting a slit light 303 toward an object 201 placed on a rotating table 301 (FIG. 6). A television camera 305 receives the slit light 303 reflected from the object 201 and produces a video signal. It is to be noted that thus produced video signal contains the contour line data of the object 201, as described below.

Referring to FIG. 6, the principle used by the object shape expression apparatus to measure the contour line data in the direction of declination angle θ, with respect to a predetermined direction, of an object 201 using a light-section method is shown. The object 201 is placed on the rotating table 301, and slit light 303 from the slit light generator 302 is impinged on the object 201. This generates a slit light projection area (contour line data at declination angle θ of the cylindrical coordinate system (r, θ, z) ) on the object 201 as the modified slit image 304. This modified slit image 304, which is modified according to the surface configuration of the object 201, is then picked up by the television camera 305. The optical axes of the slit light 303 and television camera 305 are set at a constant angle, and the three dimensional position of the modified slit image 304 can be measured using the principle of triangulation. The three dimensional spatial coordinates of the modified slit image 304 express the contour line data of the object along declination angle θ, and by rotating the rotating table 301 to turn the object 201, this contour line data can be input for any declination angle θ.

Referring back to FIG. 1, a digital image processing unit 401 processes thus produced video signal into binary data and extracts the modified slit images 304 of the object surface 201 at every declination angle θ for the further operation of object shape expression. The object shape expression apparatus further includes a third dimensional coordinate conversion unit 402 for converting positions on the modified slit image 304 into three dimensional coordinates to obtain sets of three dimensional coordinates of the object surface 201.

A surface orientation calculation unit 101 calculates the orientation of any part of the object surface 201. An area dividing unit 104 divides the objects surface 201 into a plurality of areas. A plane patch generator 105 generates plane patches according to the areas divided by the area dividing unit 104. The surface orientation calculation unit 101 comprises a normal vector calculation unit 102 for obtaining a normal vector $V_N$ based on data expressed in the three dimensional coordinate, and a spherical coordinate conversion unit 103 for conversing the normal vector $V_N$ to a normal vector $V_N'$ in a spherical coordinate expression. Thus, the tree dimensional coordinate value of plural sample points on the object surface is input. Many methods, including spot beam projection, slit light projection, and pattern beam projection, have been proposed for the method of the three dimensional coordinate measurement means that measures the three dimensional coordinates of the object surface ("3D Imaging Techniques for Measurement", Seiji Inokuchi and Kosuke Sato; Shokodo, 1990; p. 20–64). The details of operation by the surface face orientation calculation unit 101 will be later described with reference to FIG. 2.

Figure 2:
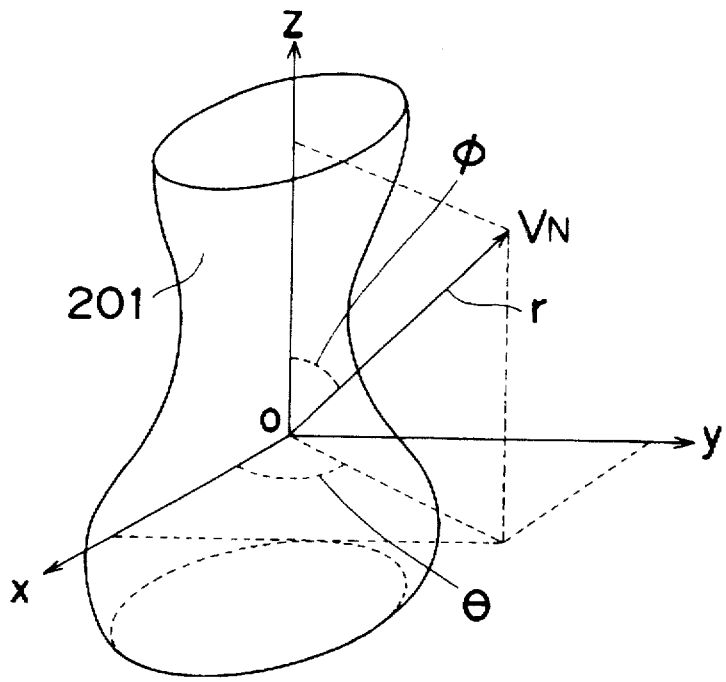
FIG. 2 is an illustration of assistance in explaining the normal vectors at surface of the object.

Referring to FIG. 2, a normal vector $V_N$ at a surface point of the object 201 is shown. The normal vector $V_N$ at any position at the object surface has a magnitude r and angular components θ and ϕ, as shown in FIG. 2. The normal vector calculation unit 102 calculates the normal vector $V_N$ (xt, yt, zt) shown in the three dimensional coordinate system at each point based on the coordinate values data from the third coordinate conversion unit 402.

The spherical coordinate conversion unit 103 converts the normal vector $V_N$ (xt, yt, zt) of a point on the object surface to the normal vector $V_N'$ in the polar coordinate system. The normal vector $V_N'=(r, θ, ϕ)$ obtained by the spherical coordinate conversion unit 103 is expressed with the following equations from the normal vector $V_N$.

$$r = \sqrt{xt^2 + yt^2 + zt^2} \quad . \tag{1}$$

$$\theta = \arctan \frac{yt}{xt} \quad . \tag{2}$$

$$\phi = \arctan \frac{\sqrt{xt^2 + yt^2}}{zt} \quad . \tag{3}$$

The area dividing unit 104 divides the sets of three dimensional coordinates of the object surface 201 into areas using the angle components θ and ϕ of the spherical coordinate expression of the normal vector $V_N'$. Each area is divided by a curve defined by a set of points satisfying the respective equations below.

$$\theta = 2\pi \times i/n \tag{4}$$

(n is a natural number, and i=0, 1, . . . n−1).

$$\phi = \pi \times j/m \tag{5}$$

(m is a natural number, and j=0, 1, . . . m−1).

Figure 5A:
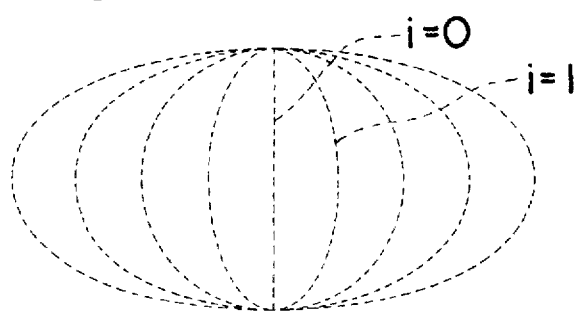
Figure 5B:
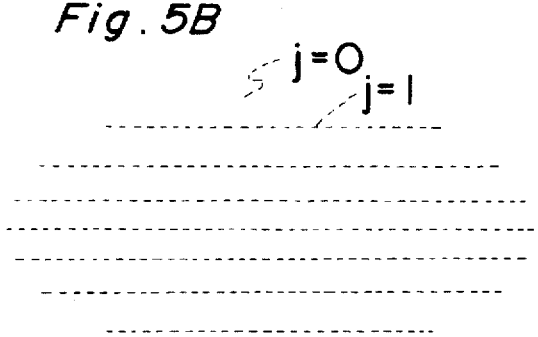
Figure 5C:
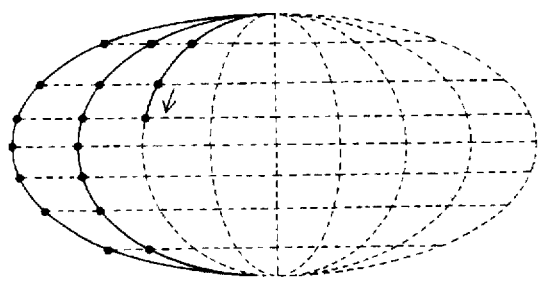

In other words, the points on the surface in area Sij, shown as areas defined by longitudinal and latitudinal lines shown in FIG. 5C, obtained by the area dividing unit 104 have the normal vector $V_N'$ expressed by the following equations.

$$2\pi \times i/n \leq \theta < 2\pi \times (i+1)/n. \tag{6}$$

$$\pi \times j/m \leq \phi < \pi \times (j+1)/m. \tag{7}$$

The area dividing unit 104 divides the entire surface expressed by the three dimensional coordinates, input to the surface orientation calculation unit 101, into areas. This means that the object surface is divided at more fine pitch as the orientation of normal vector $V_N'$ thereat varies greater. In other words, the surface of the object 201 changing the configuration thereof greater, like a curved surface, is divided into greater number of areas. To approximate the configuration changing so much, many of short lines are required, but not so much changing configuration can be sufficiently approximated by a single of (rather long) line.

By connecting the vertices of each area obtained by the area dividing unit 104 for which the value of the surface orientation is approximately equal, rectangular or other plane patches are generated by the plane patch generator 105. By performing this plane patch generation for all of the areas obtained by the area dividing unit 104 a surface model expression of plane patches for the entire object surface is generated. The details of the operation by the plane patch generator 105 will be described with reference to FIGS. 4, 5A, 5B, 5C, 5D, and 5E later.

Figure 3A:
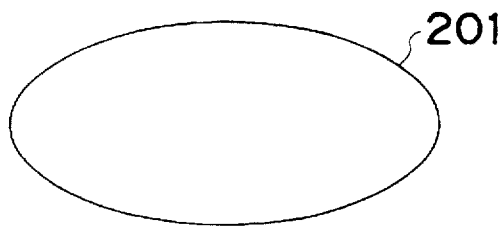
FIGS. 3A, 3B, and 3C are illustrations of assistance in explaining the method for expressing the object shape by the object shape expressing apparatus of FIG. 1.
Figure 3B:
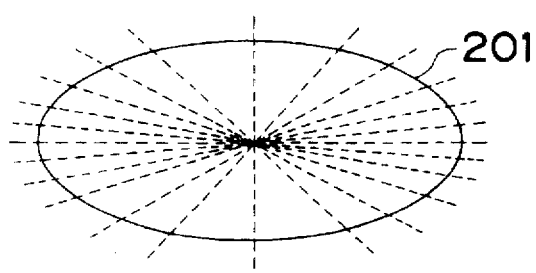
Figure 3C:
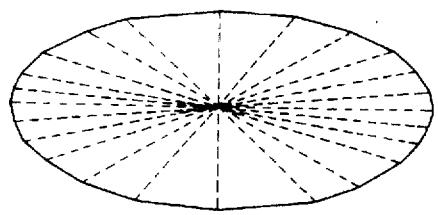

Referring to FIGS. 3A, 3B, and 3C, the concept of area division by the area dividing unit 104 and the plane patching (connected vertices) by the plane patch generator 105 described above is shown. As shown in FIG. 3A, the object 201 has, for example, an oval shape in plan view. According to the equation (6), since the oval surface area is divided according to the orientation of the normal vectors $V_N'$ at object surface, the both acute round ends thereof are divided into much more than area at the both dull ends, as shown in FIG. 3B. Each vertex (nodal point) of the divided areas are connected to a polygonal shape approximating the object 201, as shown in FIG. 3C. In this case, the acute round end is well approximated by ten short lines.

Figure 8A:
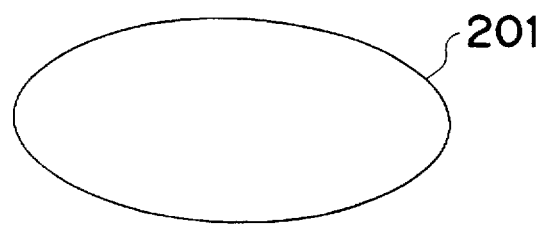
FIGS. 8A, 8B, and 8C are illustrations of assistance in explaining the method to express the object shape by the conventional shape expressing apparatus of shown FIG. 7.
Figure 8B:
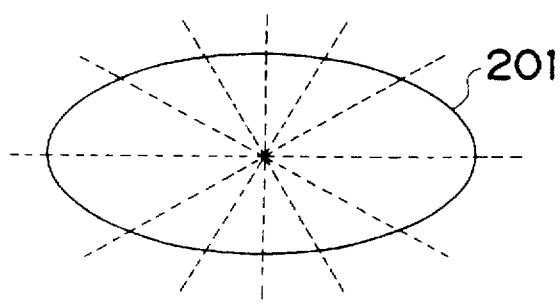
Figure 8C:
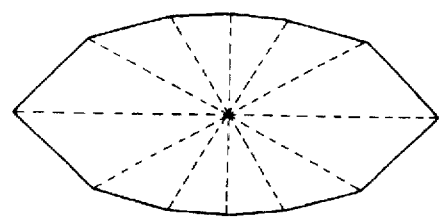

Referring to FIGS. 8A, 8B, and 8C, the concept of area division and plane patching by the conventional object shape expression apparatus is shown. The oval shaped object 201 in plan view is divided at a constant pitch angle without regard to the surface configuration, as shown in FIG. 8B. Therefore, a polygonal shape which approximates the acute round end roughly by only two straight lines are obtained, as shown in FIG. 8C.

Figure 4:
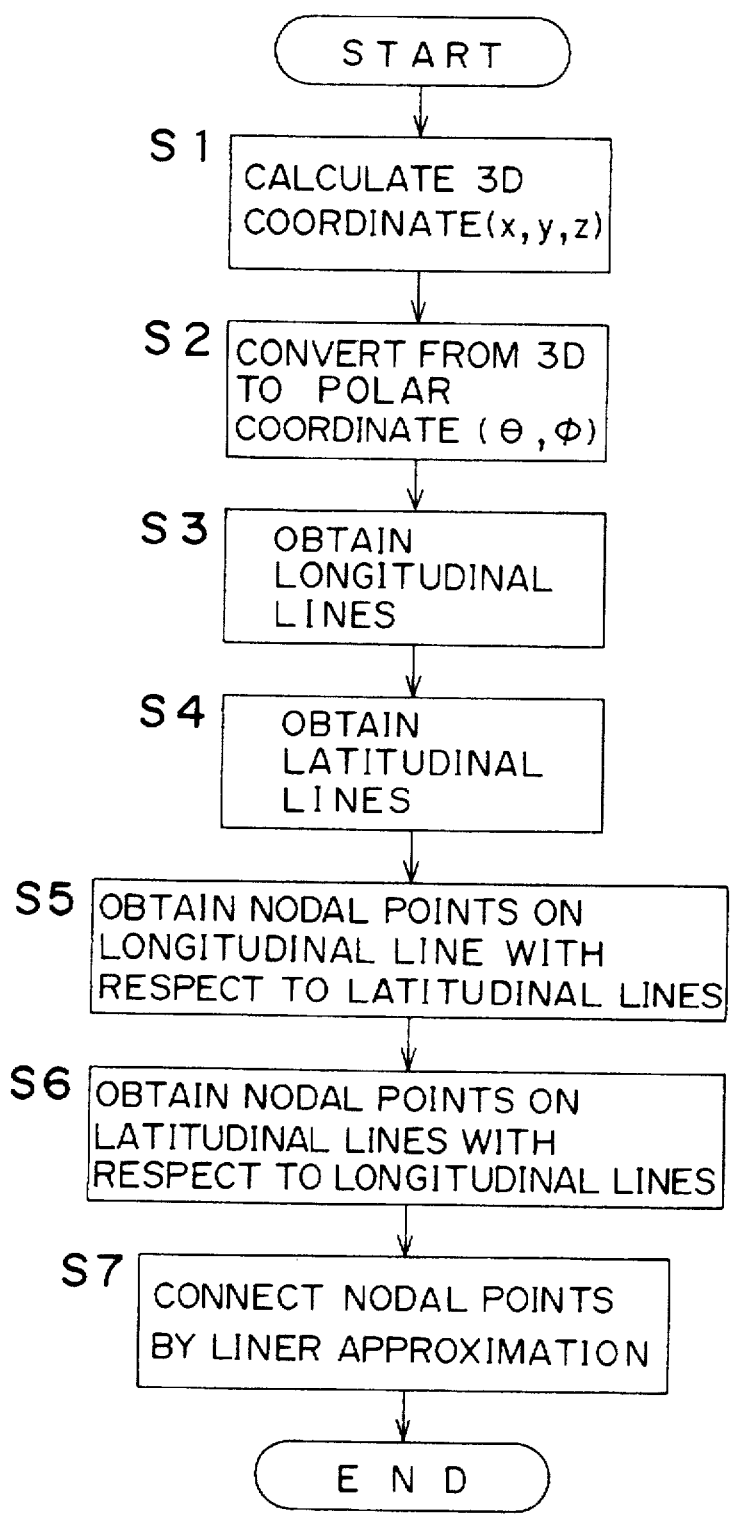
FIG. 4 is a flow chart of the object shape expressing apparatus shown in FIG. 1, FIGS. 5A, 5B, 5C, 5D, and 5E are illustrations of assistance in explaining the plane patch generation of the flow chart of FIG. 4.

Referring to FIG. 4, a flow chart of the operation by object shape expression operation according to the present invention is shown. In this case, the object 201 is formed in a oval sphere configuration for the sake of understanding.

At step S1, the three dimensional coordinate conversion unit 402 obtains the three dimensional coordinate of at the positions of object surface 201 based on the data from the digital image processing unit 401.

At step S2, the surface orientation calculation unit 101 converts the three dimensional coordinate to the spherical coordinate expression (containing $\phi$ and $\theta$).

At step S3, the area dividing unit 104 obtains the data sequence located on the longitudinal lines of the same declination angle $\theta$ defined by the equation (6), as schematically depicted by dot lines in FIG. 5A.

At step S4, the area dividing unit 104 further obtains the data sequence on the latitudinal lines of the same declination angle $\phi$ defined by the equation (7), as schematically depicted by dot lines in FIG. 5B.

At step S5, the plane patch generator 105 sequentially examines a sequence of data located on the longitudinal lines and obtains the nodal points with respect to the latitudinal lines, as schematically depicted in FIG. 5C, in which the solid lines represent the data sequence already examined, and the dots represent the obtained nodal points.

Figure 5D:
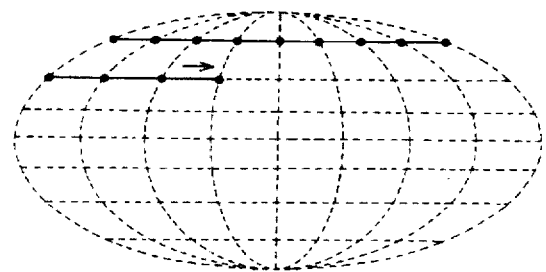

At step S6, thenafter, the plane patch generator 105 sequentially obtains the nodal points with respect to the longitudinal lines in a similar manner at step S5, as schematically depicted in FIG. 5D.

Figure 5E:
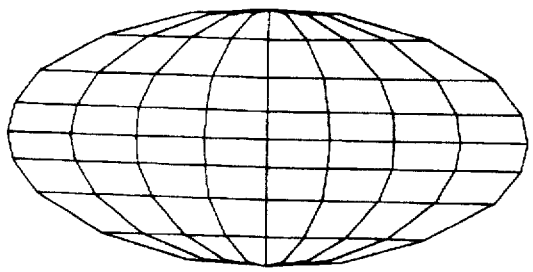
Figure 7:
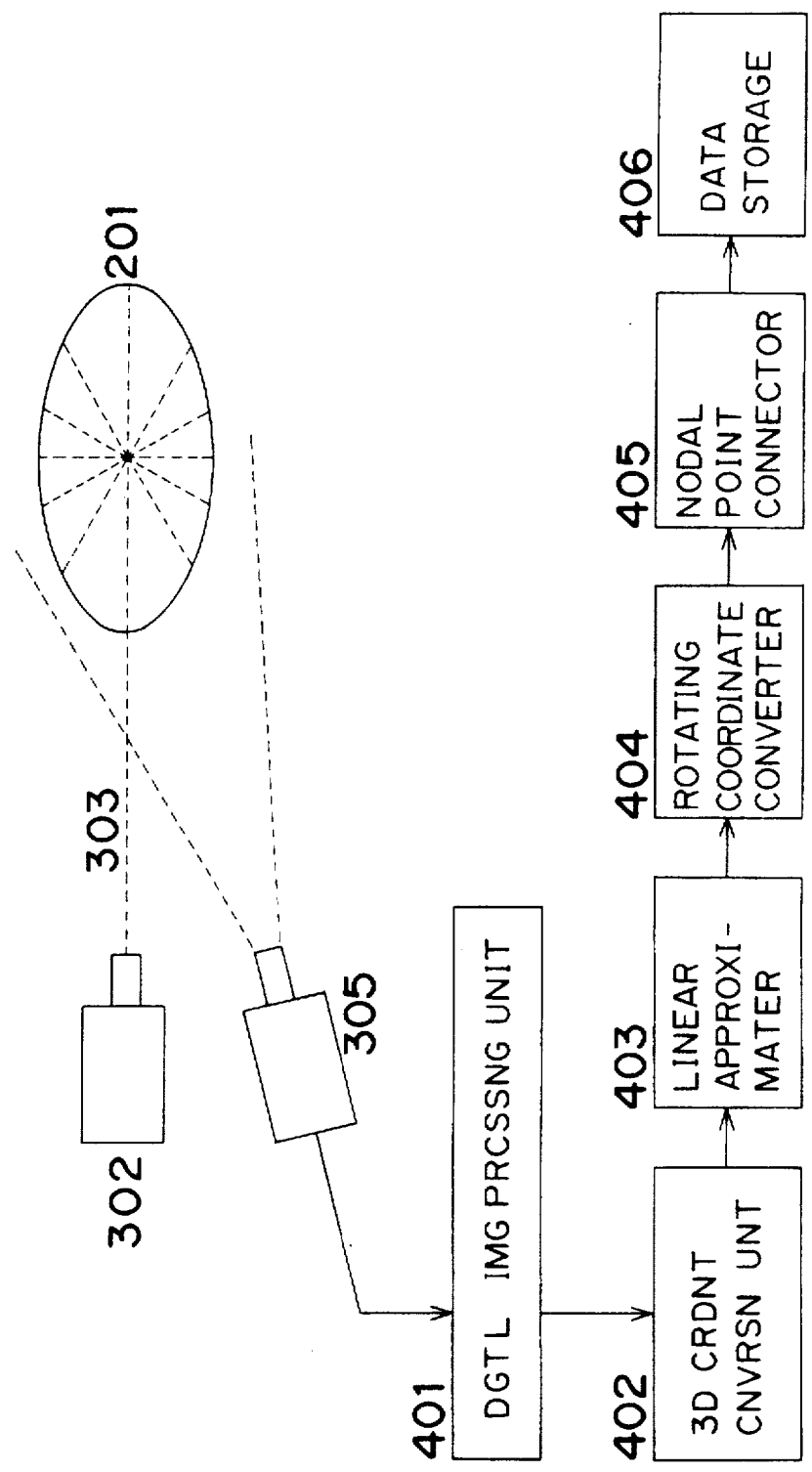
FIG. 7 is a block diagram showing a conventional object shape expressing apparatus.

At step S7, thenafter, the plane patch generator 105 sequentially connects every nodal point along the examined longitudinal and latitudinal lines and produces rectangular plane patches, as schematically depicted in FIG. 5E.

It is to be noted that the plane patch generator 105 can be constructed to approximate each of the areas obtained by the area dividing unit 104 with curved planes. In this curved patch generator 105, the vertices of each area obtained by the area dividing unit 104 are defined as connecting points or control points, and an approximate curved plane is generated. Because each of the connecting points and control points has normal orientation data, the difficulty of automatically generating curved planes is decreased, and a curved plane can be approximated with good precision. Various methods, including B-spline curves, NURBS, and Bezier curves, have been proposed for curved plane approximation, and the present invention shall not be limited by the method of curved plane approximation.

Thus, according to the present invention, object surface shapes can be expressed with little error and a smaller quantity of data, such as the number of nodal points and number of flat patches, by efficiently expressing an object based on the surface shape irrespective of the whole shape.

The present invention further can express the surface shape of a real solid object with little error by dividing the object surface into areas of approximately equal surface orientation expressed with a single three dimensional model (a single flat patch or curved patch). Moreover, it is possible to reduce the number of flat patches and other three dimensional models and generate a solid surface model or other approximate model.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An object shape expression apparatus for expressing an object's shape comprising:
   surface data generating means for generating surface data of said object;
   surface data dividing means for (1) dividing said surface data by a plurality of longitudinal lines and a plurality of latitudinal lines, and (2) dividing said surface data into a plurality of sections using said plurality of longitudinal lines and said plurality of latitudinal lines, each section containing a plurality of surface data, and normal lines extended from a surface defined by said surface data in one section being within a predetermined tilted angle from each other; and
   surface data replacing means for replacing said surface data in one section with a plurality of substitute surface data which define a plane surface on said one section.

2. An object shape expression apparatus as claimed in claim 1, wherein said surface data generating means comprises:
   slit light source means for generating a slit light, said slit light being impinged on said object surface;
   video signal producing means for receiving said slit lights reflected from said object to produce a video signal;
   video signal processing means for processing said video signal to obtain three dimensional coordinate data representing said object surface; and
   surface orientation calculation means for calculating tilted angle of normal lines extended from said object surface defined by said three dimensional coordinate data.

3. An object shape expression apparatus as recited in claim 1, wherein:
   the object has an axis;
   each one of the plurality of longitudinal lines is substantially parallel to the axis; and each one of the plurality of latitudinal lines is substantially perpendicular to the axis.

4. An object shape expression apparatus as recited in claim 1, wherein one of the plurality of sections includes surface data located between the plurality of longitudinal lines and the plurality of latitudinal lines dividing the surface data.

5. An object shape expressing apparatus according to claim 1 wherein the surface data dividing means divides said three dimensional data using the normal lines.

6. An object expression apparatus for expressing an object's shape comprising:
   slit light source means for generating a slit light, said slit light being impinged on an object surface;
   video signal producing means for receiving said slit light reflected from said object to produce a video signal;
   video signal processing means for processing said video signal to obtain three dimensional coordinate data representing said object surface;

surface orientation calculation means for calculating a tilted angle of normal lines extended from said object surface defined by said three dimensional coordinate data, said surface orientation calculation means comprising normal vector calculation means for obtaining a first normal vector extending from said object surface defined by said three dimensional coordinate data and spherical coordinate conversion means for converting said first normal vector to a second normal vector in a spherical coordinate expression;

surface data dividing means for (1) dividing said surface data by a plurality of longitudinal lines and a plurality of latitudinal lines, and (2) dividing said surface data into a plurality of sections using said plurality of longitudinal lines and said plurality of latitudinal lines, each section containing a plurality of surface data, and the normal lines extended from a surface defined by said surface data in one section being within a predetermined tilted angle from each other; and surface data replacing means for replacing said surface data in one section with a plurality of substitute surface data which define a plane surface on said one section.

7. An object shape expression apparatus as recited in claim 6, wherein one of the plurality of sections includes surface data located between the plurality of longitudinal lines and the plurality of latitudinal lines dividing the surface data.

8. An object shape expressing apparatus according to claim 6 wherein the surface data dividing means divides said three dimensional data using the normal lines.

9. An object shape expression apparatus for expressing an object's shape based on three dimensional coordinate data of said object surface, said apparatus comprising:

surface orientation calculation means for calculating tilted angle of normal lines extended from said object surface defined by said three dimensional coordinate data, surface data dividing means for (1) dividing said three dimensional data by a plurality of longitudinal lines and a plurality of latitudinal lines, and (2) dividing said surface data into a plurality of sections using said plurality of longitudinal lines and said plurality of latitudinal lines, each section containing a plurality of said three dimensional coordinate data, and the normal lines extended from a surface defined by said three dimensional coordinate data in one section being within a predetermined tilted angle from each other; and surface data replacing means for replacing said surface data in one section with a plurality of substitute surface data which define a plane surface on said one section.

10. An object shape expression apparatus as recited in claim 9, wherein:

the object has an axis;

each one of the plurality of longitudinal lines is substantially parallel to the axis; and each one of the plurality of latitudinal lines is substantially perpendicular to the axis.

11. An object shape expression apparatus as recited in claim 9, wherein the surface data generating means comprises a slit light source means for generating a slight light where said slit light is impinged on said object.

12. An object shape expression apparatus as recited in claim 9, wherein one of the plurality of sections includes surface data located between the plurality of longitudinal lines and the plurality of latitudinal lines dividing the surface data.

13. An object shape expressing apparatus according to claim 9 wherein the surface data dividing means divides said three dimensional data using the normal lines.

14. An object shape expressing apparatus for expressing a shape of an object comprising:

first three dimensional data producing means for producing first three dimensional data to define a surface of the object;

normal vector detecting means for detecting normal vectors extending from the surface of the object defined by said first three dimensional data; and dividing means for dividing said first three dimensional data having normal vectors within a predetermined tilted angle from each other by a plurality of longitudinal lines and a plurality of latitudinal lines.

15. An object shape expressing apparatus as claimed in claim 14, further comprising second three dimensional data producing means for producing second three dimensional data representative of the shape of said object expressed by said plurality of longitudinal lines and said plurality of latitudinal lines.

16. An object shape expressing apparatus as claimed in claim 15, wherein a quantity of said second three dimensional data is less than a quantity of said first three dimensional data.

17. An object shape expressing apparatus as claimed in claim 15, further comprising third three dimensional data producing means for producing three dimensional data representing the shape of said object expressed by patches defined by said plurality of longitudinal lines and said plurality of latitudinal lines.

18. An object shape expressing apparatus as claimed in claim 17, wherein a quantity of said third three dimensional data is less than a quantity of said first three dimensional data.

19. An object shape expressing method for expressing a shape of an object comprising the steps of:

producing first three dimensional data defining a surface of the object;

detecting normal vectors extending from the surface of the object defined by said first three dimensional data; and dividing said first three dimensional data having normal vectors within a predetermined tilted angle from each other by a plurality of longitudinal lines and a plurality of latitudinal lines.

20. An object shape expressing method as claimed in claim 17, further comprising the step of producing second three-dimensional data representing a shape of said object expressed by said plurality of longitudinal lines and said plurality of latitudinal lines.

21. An object shape expressing method as claimed in claim 20 wherein a quantity of said second three dimensional data is less than a quantity of said first three dimensional data.

22. An object shape expressing method as claimed in claim 20 further comprising the step of producing third three dimensional data representing the shape of the object expressed by patches defined by said plurality of longitudinal lines and said plurality of latitudinal lines.

23. An object shape expressing method as claimed in claim 22 wherein a quantity of said third three dimensional data is less than a quantity of said first three dimensional data.

24. An object shape expression apparatus for expressing a shape of an object comprising:

surface data generating means for generating surface data of the object;

surface data dividing means for (1) dividing the surface data by a plurality of longitudinal lines and a plurality of latitudinal lines, and (2) dividing the surface data into a plurality of sections using the plurality of longitudinal lines and the plurality of latitudinal lines, each of the plurality of sections containing a plurality of surface data, and normal lines extended from a surface defined by said surface data in one section being within a predetermined polar angle in a spherical coordinate system from each other; and surface data replacing means for replacing the surface data in one section with a plurality of substitute surface data which define a plane surface on a section.

25. An object shape expression apparatus for expressing a shape of an object comprising:

surface data generating means for generating surface data of the object;

surface data dividing means for (1) dividing the surface data by a plurality of longitudinal lines and a plurality of latitudinal lines, and (2) dividing the surface data into a plurality of sections using the plurality of longitudinal lines and the plurality of latitudinal lines, each one of the plurality of sections containing a plurality of surface data, and normal lines extended from a surface defined by the surface data in one section being within a predetermined tilted angle from each other;

surface data replacing means for replacing the surface data in one of the plurality of sections with a plurality of substitute surface data which define a plane surface on the section; and surface orientation calculation means for calculating the tilted angle.

26. An object shape expression apparatus as claimed in claim 25, wherein the surface orientation means comprises:

normal vector calculation means for obtaining a first normal vector extending from the surface data defined by three dimensional coordinate data; and spherical coordinate conversion means for converting the normal vector to a second normal vector in a spherical coordinate expression.

27. An object shape expression apparatus for expressing a shape of an object comprising:

surface data generating means for generating surface data of said object, the surface data generating means comprising:

(a) slit light source means for generating a slit light, said slit light being impinged on said object surface;

(b) video signal processing means for receiving said slit light reflected from said object to produce a video signal;

(c) video signal processing mean for processing said video signal to obtain three-dimensional coordinate data representing said object surface; and (d) surface orientation calculation means for calculating a tilted angle of normal lines extended from said object surface defined by said three-dimensional coordinate data, the surface orientation calculation means comprising:

(d1) normal vector calculation means for obtaining a first normal vector extending from said object surface defined by said three dimensional coordinate data; and (d2) spherical coordinate conversion means for converting said normal vector to a second normal vector in a spherical coordinate expression; and surface data dividing means for (1) dividing said surface data by a plurality of longitudinal lines and a plurality of latitudinal lines, and (2) dividing said surface data into a plurality of sections using said plurality of longitudinal lines and said plurality of latitudinal lines, each section containing a plurality of surface data, and normal lines extended from a surface defined by said surface data in one section being within a predetermined tilted angle from each other; and surface data replacing means for replacing the surface data in one section with a plurality of substitute surface data which define a plane surface on a section.

* * * * *

UNITED STATES PATENT AND TRADE MARK OFFICE
CERTIFICATE OF CORRECTION

PATENT NO.   : 5,754,680
DATED        : May 19, 1998
INVENTOR(S)  : Sato et al.

It is certified that error appears in the above-identified patent and that said Letters Patent is hereby corrected as shown below:

Cover page, item [56] References Cited, U.S. Patent 5,189,626, "Colburu" should be --Colburn--.

Column 6, line 48, "each one..." should begin a new paragraph.

Column 8, line 45, "17" should be --19--.

Signed and Sealed this

Second Day of February, 1999

Attest:

Attesting Officer

*Acting Commissioner of Patents and Trademarks*